(12) United States Patent
Wadsworth

(10) Patent No.: US 11,999,086 B2
(45) Date of Patent: Jun. 4, 2024

(54) SYSTEM FOR FORMING A COMPOSITE PART

(71) Applicant: Spirit AeroSystems, Inc., Wichita, KS (US)

(72) Inventor: Mark Anthony Wadsworth, Sedan, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

(21) Appl. No.: 17/487,090

(22) Filed: Sep. 28, 2021

(65) Prior Publication Data

US 2023/0100049 A1 Mar. 30, 2023

(51) Int. Cl.
 *B29C 45/14* (2006.01)
(52) U.S. Cl.
 CPC .. *B29C 45/14065* (2013.01); *B29C 45/14311* (2013.01); *B29C 2045/14327* (2013.01)
(58) Field of Classification Search
 CPC ......... B29C 45/14065; B29C 45/14311; B29C 2045/14327
 See application file for complete search history.

(56) References Cited

U.S. PATENT DOCUMENTS

| | | | |
|---|---|---|---|
| 4,201,612 A | * | 5/1980 | Figge ........................ B32B 7/04 156/221 |
| 4,734,230 A | | 3/1988 | Rhodes, Jr. et al. |
| 4,933,131 A | | 6/1990 | Okey et al. |
| 5,283,028 A | * | 2/1994 | Breezer ................... B29C 43/34 156/228 |
| 5,415,536 A | * | 5/1995 | Ohno ................... B29C 45/1418 425/127 |
| 5,672,309 A | | 9/1997 | Masui et al. |
| 5,672,405 A | | 9/1997 | Plank, Jr. et al. |

(Continued)

FOREIGN PATENT DOCUMENTS

| AU | 2003203302 | * | 7/2003 |
|---|---|---|---|
| DE | 4033297 | * | 5/1991 |

(Continued)

OTHER PUBLICATIONS

International Search Report and Written Opinion in related PCT Application PCT/US2022/044391 dated Jan. 16, 2023, 10 pages.

*Primary Examiner* — Edmund H Lee
(74) *Attorney, Agent, or Firm* — Stinson LLP

(57) ABSTRACT

Tooling, systems, and methods for forming composite parts. The system includes a mold having a first mold portion with a molding surface, a second mold portion with a molding surface, and at least one laminate sheet opening. When the mold is in a closed, molding configuration, the first molding surface and the second molding surface collectively at least partially form an internal cavity defining an outer contour of the composite part. The system also comprises an injection molding nozzle that injects resin into the internal cavity and a laminate sheet supporting frame. The laminate sheet supporting frame supports at least one laminate sheet such that a portion of the at least one laminate sheet is permitted to pass through the at least one laminate sheet opening and conform to at least one of the first molding surface and the second molding surface during the forming of the composite part.

13 Claims, 12 Drawing Sheets

(56) References Cited

U.S. PATENT DOCUMENTS

| | | | |
|---|---|---|---|
| 5,707,581 A * | 1/1998 | Yamazaki | B29C 45/1418 264/153 |
| 5,783,133 A | 7/1998 | Hara et al. | |
| 5,993,719 A * | 11/1999 | Abe | B29C 45/561 264/510 |
| 6,149,853 A * | 11/2000 | Luckett | B60R 13/0243 296/146.7 |
| 6,428,727 B1 * | 8/2002 | Rees | B29C 31/065 425/557 |
| 7,105,120 B2 * | 9/2006 | Skinner | B29C 70/025 264/261 |
| 8,216,501 B2 * | 7/2012 | Egerer | B29C 43/18 264/261 |
| 8,945,450 B2 | 2/2015 | Shindo et al. | |
| 9,889,587 B2 | 2/2018 | Ni et al. | |
| 2005/0248058 A1 * | 11/2005 | Takayama | B29C 45/14467 264/275 |
| 2010/0108433 A1 * | 5/2010 | Takayama | H04R 31/003 181/170 |
| 2018/0257275 A1 | 9/2018 | Chiu et al. | |

FOREIGN PATENT DOCUMENTS

| | | | |
|---|---|---|---|
| EP | 0913791 | * | 5/1999 |
| FR | 2803790 | * | 7/2001 |
| JP | 05278066 | * | 10/1993 |
| JP | 2546315 | * | 10/1996 |
| JP | 2000280295 | * | 10/2000 |
| JP | 2000296533 | * | 10/2000 |
| JP | 2003080557 | * | 3/2003 |
| JP | 2004050457 | | 2/2004 |
| JP | 2019084786 | | 6/2019 |
| WO | WO9726814 | * | 7/1997 |

* cited by examiner

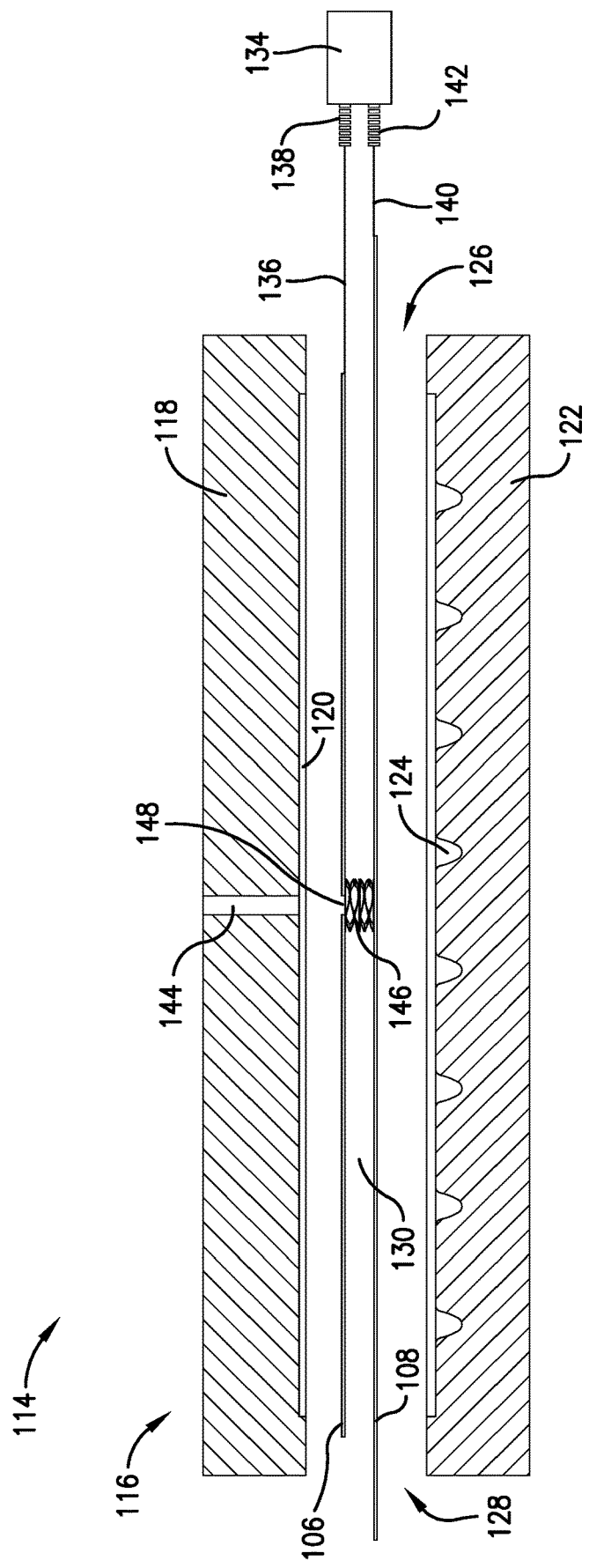

US 11,999,086 B2

SYSTEM FOR FORMING A COMPOSITE PART

BACKGROUND

Many components of aircrafts and other vehicles or structures are formed from composite materials that may include layers, or plies, of suitable filler or fiber material bonded together using a resin matrix or the like. In some instance, the composite materials may be formed from a laminate sheet base and have certain contoured or other features overmolded on top of the laminate sheet base. Such construction allows for the use of laminate sheets, which add rigidity and strength to composite parts, together with flowable resin, which can be used to create more complex or contoured features of the composite part.

The types of composite parts that can be formed from such overmolding processes is limited because, due to the relative rigid nature of laminate sheets, the structural sheets cannot form part of complex geometries and contours of the composite part, often leaving those areas prone to failure. Thus, composite parts formed from laminate sheets overmolded with resin contoured features have limited applications, particularly when used for structural components of an aircraft or other structures.

BRIEF SUMMARY

Embodiments of the disclosure are directed to composite parts, molds, systems for forming such composite parts, and methods of forming such composite parts. At a high level, the composite parts may include multiple laminate sheets, including one or more laminate sheets provided at areas of the composite part that will be subject to the greatest stresses during use thereby improving the strength and fatigue resistance to the composite part. The molds and systems utilize a laminate sheet supporting frame and an at least partially open mold that permits hot, and thus pliable, laminate sheets to be fed into the mold during a forming process and conform to the outer contours of the composite part being formed due to the hydrostatic pressure of a molding compound pressing against the sheets.

For example, some embodiments are directed to a system for forming a composite part. The system comprises a mold including a first mold portion including a first molding surface, a second mold portion including a second molding surface, and at least one laminate sheet opening. When the mold is in a closed, molding configuration, the first molding surface and the second molding surface collectively at least partially form an internal cavity defining an outer contour of the composite part being formed. The system also comprises an injection molding nozzle configured to inject resin into the internal cavity during the forming of the composite part, and a laminate sheet supporting frame. The laminate sheet supporting frame is configured to support at least one laminate sheet such that a portion of the at least one laminate sheet is permitted to pass through the at least one laminate sheet opening and conform to at least one of the first molding surface and the second molding surface during the forming of the composite part.

Other embodiments are directed to a mold for forming a composite part. The mold comprises a first mold portion including a first molding surface, a second mold portion including a second molding surface, and at least one laminate sheet opening formed between the first mold portion and the second mold portion when the mold portions are in a closed, molding configuration. When the mold is in the closed, molding configuration, the first molding surface and the second molding surface collectively at least partially form an internal cavity defining an outer contour of the composite part being formed. The at least one laminate sheet opening is configured to permit a portion of at least one laminate sheet to enter the internal cavity from an outside of the mold during the forming of the composite part.

Still other embodiments are directed to a method of forming a composite part. The method comprises suspending at least one laminate sheet in a supporting frame and closing a mold around the at least one laminate sheet such that a portion of the at least one laminate sheet extends outside of the closed mold through an opening provided in the mold. The mold includes an internal cavity at least partially defining an outer contour of a part being formed, and the method further comprises molding the composite part by injecting resin into the internal cavity while simultaneously permitting the portion of the at least one laminate sheet extending outside of the closed mold to enter the closed mold through the opening and conform to at least a portion of the internal cavity.

These and other features will be discussed in more detail below in connection with the accompanying drawings.

BRIEF DESCRIPTION OF THE DRAWINGS

Embodiments of the disclosure are described in detail below with reference to the attached drawing figures, wherein:

FIGS. 6A-6F show the system of FIG. 5 in various configurations as the system forms a composite part, such as the composite part shown in FIGS. 1-4, according to some aspects of the disclosure;

DETAILED DESCRIPTION

Figure 2:
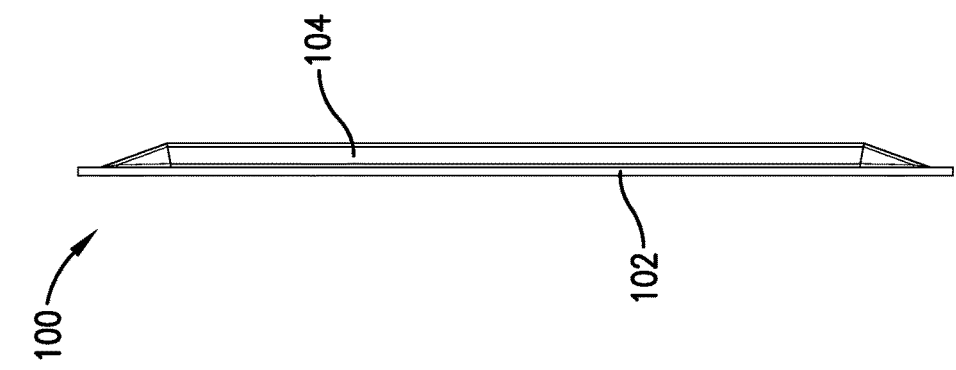
FIG. 2 is a left side, elevation view of the composite part shown in FIG. 1.
Figure 1:
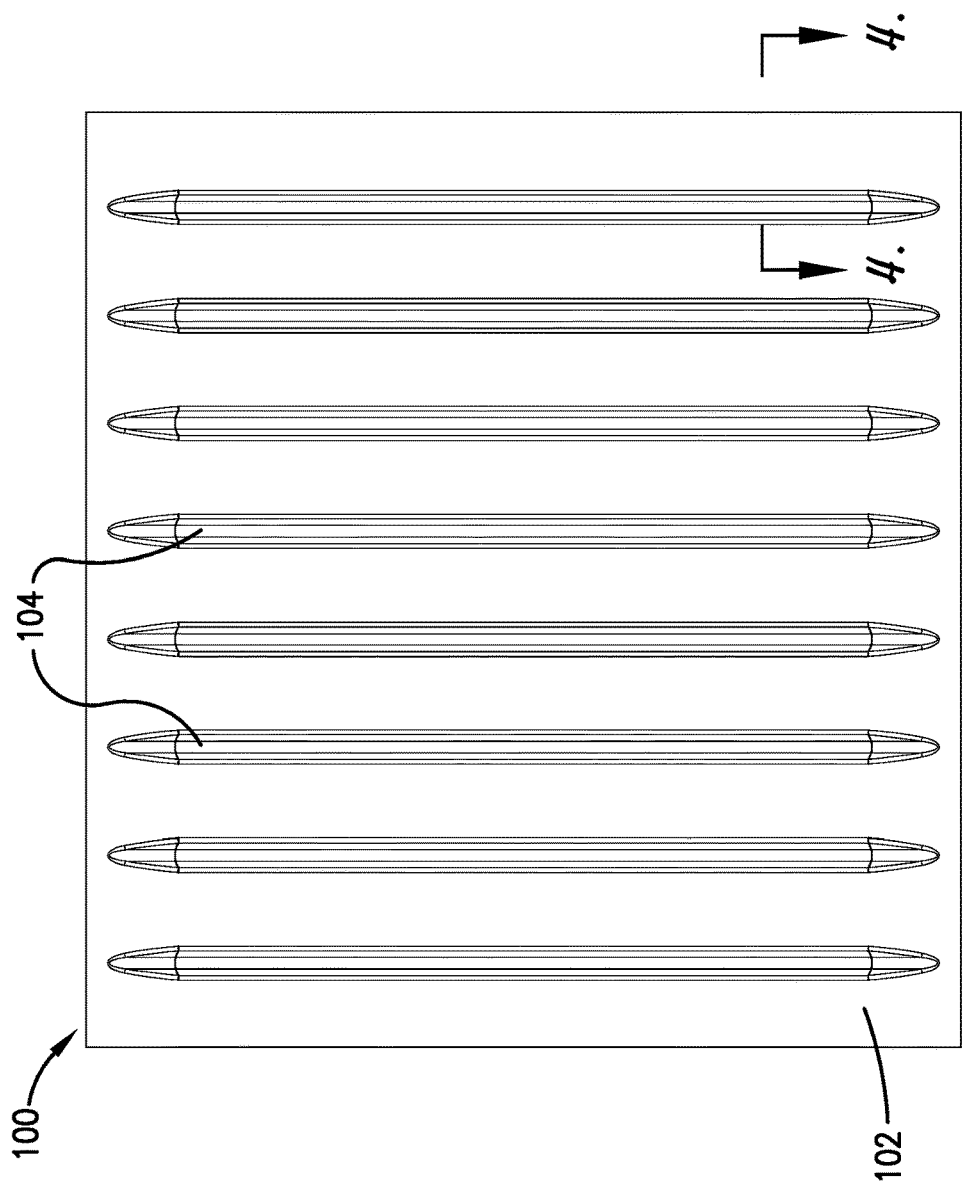
FIG. 1 is a top view of a composite part according to some aspects of the disclosure.
Figure 3:
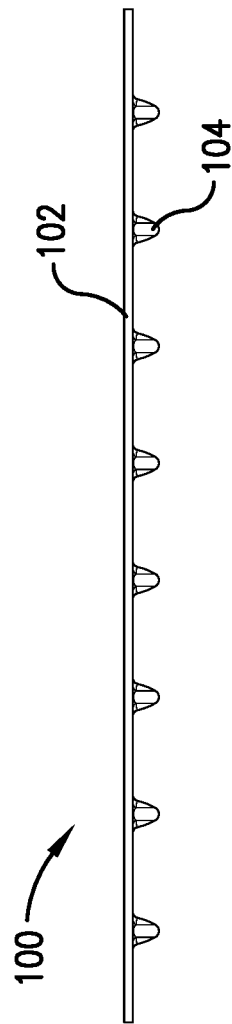
FIG. 3 is a front view of the composite part shown in FIGS. 1 and 2.

The following detailed description references the accompanying drawings that illustrate specific embodiments of the disclosure. The embodiments are intended to describe aspects of the disclosure in sufficient detail to enable those skilled in the art to practice the various embodiments. Other embodiments can be utilized, and changes can be made without departing from the scope of the disclosure. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the current technology can include a variety of combinations and/or integrations of the embodiments described herein.

Generally, aspects of the disclosure are directed to composite parts, methods of forming such composite parts, and systems and tooling used for forming such composite parts. At a high level, the composite parts are formed from sheets of laminate or similar fiber-reinforced material together with a flowable resin or other molding compound. In some embodiments, the sheets of laminate are heated to a melting or workability temperature and placed into a mold used to form the composite part. The sheets of laminate can be heated to the melting or workability temperature using any suitable heating means and in some embodiments are heated via a furnace, oven, induction heater, open flame, or similar. Once the molten laminate sheets are in the mold, a molding compound of resin is injected between the sheets. The hydrostatic pressure of the molding compound or resin presses the laminate sheets into the various mold cavities, thereby conforming the laminate sheets to the outer contour of the composite part being formed. Put another way, the hydrostatic pressure of the molding compound or resin is used to consolidate and form the two laminate sheets, which serve as outer skins of the composite part, once formed. In some embodiments, the molding compound or resin has a relatively high viscosity in order to provide a sufficient pressure drop to consolidate and form the hot laminate sheets. The resin may also include various fillers such as fibers, metallic particles, or otherwise. These and other features will become more apparent in connection with the description of the various figures.

First, FIGS. 1-4 show one example of a composite part 100 that is formed according to aspects of the disclosure. The composite part 100 includes a main body 102 with various contoured features 104—in this instance, a series of ribs—extending therefrom. Although the composite part 100 illustrated is relatively simple, it should be appreciated that the configuration shown is only for ease of discussion and, in practice, the composite part 100 could take a variety of shapes, contours, and geometries without departing from the scope of the disclosure.

Figure 4:
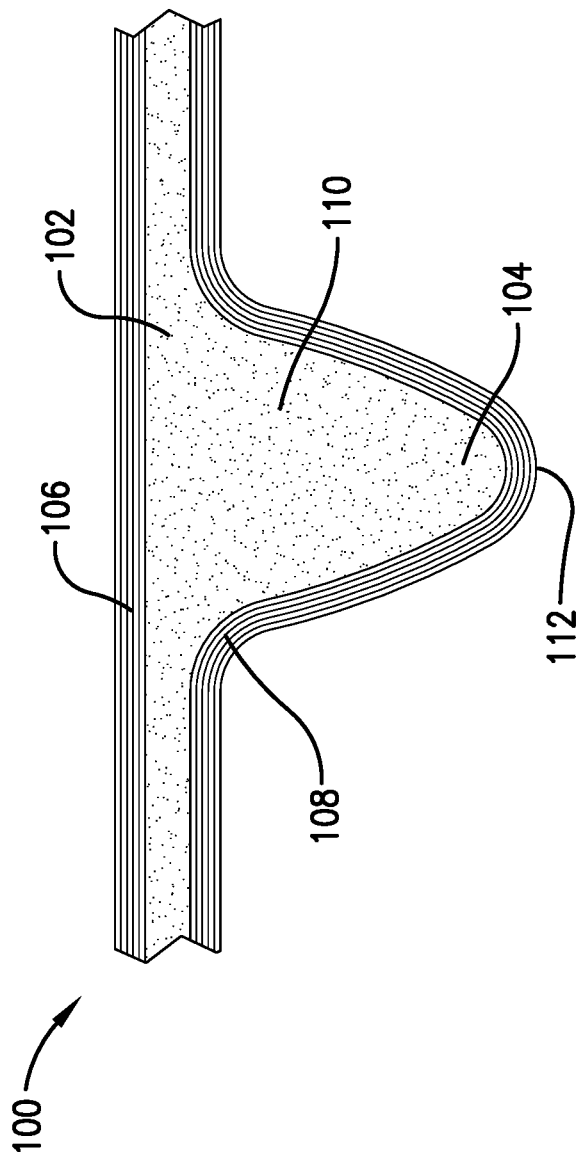
FIG. 4 is a partial, cross-sectional view of the composite part shown in FIGS. 1-3, as viewed along line 4-4 in FIG. 1.

As best seen in FIG. 4, the composite part 100 generally includes two laminate sheet layers 106, 108 sandwiching a molding compound or resin 110 layer therebetween. As used herein, laminate sheet refers to any fiber-reinforced or other composite sheet used in overmolding and similar processes. At a high level, laminate sheets are formed by stacking and laminating thin sheets of material such as, among others, pre-impregnated plies of fiber or other suitable fiber and resin sheets, paper, plastic, woven fiber composites, various metals, and similar materials. The thin sheets of material may be laminated to one another through any suitable bonding process such as, without limitation, adhesive bonding, thermal bonding, ultrasonic welding or brazing, etc. In some embodiments, the laminate sheet may be a discontinuous fiber reinforced laminate sheet such as Tailored universal Feedstock for Forming (TuFF) produced by the University of Delaware. Resin refers broadly to any suitable molding compound used in an injection molding process and includes, without limitation: plastics such as acrylonitrile butadiene styrene (ABS), low-density polyethylene (LDPE) and high-density polyethylene (HDPE); polycarbonate (PC), polyamide (Nylon), high impact polystyrene (HIPS), polypropylene (PP), acrylic (PMMA), polyetheretherketone (PEEK), polyetherketoneketone (PEKK), polyphenylene Sulfide (PPS), Polyaryletherketone (PAEK), acetal/polyoxymethylene (POM), and thermoplastic polyurethane (TPU); thermoplastic rubber; flowable metallic or fiber reinforced resins; and other suitable molding compounds. The resin may include various fillers such as milled fibers, metallic particles, nanobubbles or other air pockets, and similar fillers to provide improvement to the mechanical properties of the resin or to modify its flow behavior.

Many traditional composite parts typically include a single laminate sheet layer (similar to the first laminate sheet 106) with any contoured features (similar to the ribs 104) overmolded thereon using an injection molding compound or resin (similar to resin 110), but do not include the second laminate sheet layer 108. Certain portions of such composite parts, and in particular the contoured features thereof, are thus susceptible to failure under certain loading conditions because the strongest portion of the composite part (the laminated sheet) is not located at the portion of the part undergoing the greatest loads (i.e., the ridge of the rib or other contoured feature).

In contrast, the composite part 100 of the instant disclosure sandwiches the molded resin 110 features, thereby providing reinforcement at both faces of the composite part 100. For example, an outer ridge 112 of each contoured rib 104, which under certain loading conditions would be the point on the composite part 100 subjected to the maximum bending stress, is reinforced due to the presence of the second laminate sheet 108 on the contoured features 104 of the composite part 100. This provides reinforcement at critical locations along the composite part 100, thereby providing enhanced strength as compared to known composite parts.

Aspects of the disclosure provide tooling, systems, and methods for forming a composite part, such as the composite part 100 shown in FIGS. 1-4 or other similarly contoured composite part. At a high level, the tooling, systems, and methods do so by permitting hot or pliable sheets of laminate 106, 108 or similar components of a composite part 100 to be fed into an injection mold during a forming process so that the hot sheets 106, 108 conform to the outer contours of the molded composite part 100 under the hydrostatic pressure of the molding compound or resin 110. By permitting the sheets 106, 108 to be fed into the molding system, as necessary, the tooling, systems, and methods permit the sheets 106, 108 to surround even complex contours, such as the raised contoured features 104 of the composite part 100 or otherwise.

Figure 5:
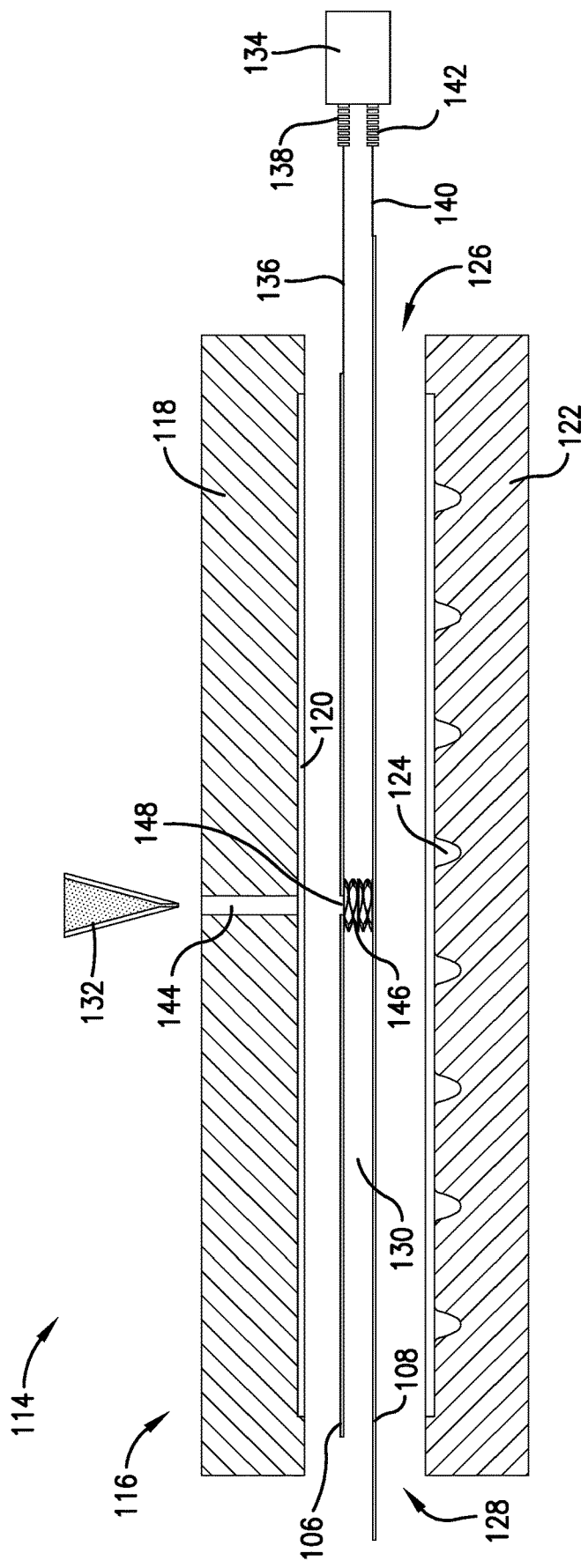
FIG. 5 is a cross-sectional view of a system for forming a composite part, such as the composite part shown in FIGS. 1-4, according to some aspects of the disclosure.

FIG. 5 illustrates one embodiment of a system for forming a composite part 114 according to aspects of the disclosure. The system 114 includes a mold 116 having a first mold portion 118—in the depicted embodiment, a top mold portion—and a second mold portion 122—in the depicted embodiment, a bottom mold portion. The first mold portion 118 includes a first molding surface 120, and the second mold portion 122 includes a second molding surface 124. When the first mold portion 118 and the second mold portion 122 are closed—that is, brought together in a closed, molding configuration—the first molding surface 120 and the second molding surface 122 collectively form an internal cavity 130 defining an outer contour of the composite part 100 being formed. More particularly, when the system 114 is used to form the exemplary composite part 100 shown in FIGS. 1-4, the first molding surface 120 may be generally sized and configured as a flat, planar surface following the contour of the generally planar main body 102 of the composite part. The second molding surface 124 may be generally sized and configured as a series of troughs following the contour of the ribbed, contoured features 104 of the composite part. When the mold 116 is closed with the first portion 118 abutting the second portion 122, the internal cavity 130 will thus have the same cross-sectional shape as the composite part 100.

The mold 116 may also include one or more laminate sheet openings 126, 128. The laminate sheet openings 126, 128 provide a gap between the two mold portions 118, 122 when the mold 116 is closed, thereby providing communication from the internal cavity 130 and an exterior of the mold 116. These laminate sheet openings 126, 128 permit portions of one or more laminate sheets 106, 108 to generally enter the internal cavity 130 of the mold 116 as the composite part 100 is being formed, thereby generally conforming to the contours of the internal cavity 130 generally and to the first and/or second molding surfaces 120, 124 more specifically. This will be better understood below when discussing FIGS. 6A-6F.

The system 114 may also include additional features such as an injection molding nozzle 132 and a laminate sheet supporting frame 134. The injection molding nozzle 132 may be generally configured to inject a molding compound, such as resin 110, into the mold 116 during the forming of the composite part 100. For example, in some embodiments at least one portion of the mold 116 may include an injection opening or gate 144 through which the molding compound or resin 110 is injected during the forming process. In the depicted embodiment, the first mold portion 118 includes the gate 144, which is generally a passageway in communication with the internal cavity 130, but in other embodiments the second mold portion 122 may include an injection opening instead of or in addition to the gate 144 provided in the first mold portion 118. Moreover, in other embodiments an injection opening may be provided elsewhere on the mold 116 such as, for example, on one side of the mold 116 near either the first laminate sheet opening 126 or the second laminate sheet opening 128 without departing from the scope of the disclosure.

The laminate sheet supporting frame 134 is configured to support the laminate sheets, such as, e.g., the first laminate sheet 106 and the second laminate sheet 108 in a tensioned, yet movable, manner within the mold 116. In the depicted embodiment, the laminate sheet supporting frame 134 is external to the mold 116, but in other embodiments the laminate sheet supporting frame 134 could be integral to and/or inside the mold 116 without departing from the scope of the disclosure. In any event, the laminate sheet supporting frame 134 supports the laminate sheets 106, 108 such that a portion of the laminate sheets 106, 108 are permitted to pass through at least one of the laminate sheet openings 126, 128 and conform to at least one of the first molding surface 120 and the second molding surface 124 during the forming of the composite part 100. By supporting the sheets 106, 108 in such a way, the sheets 106, 108 are generally permitted to play into the mold 116 during the forming process thereby conforming to the outer contour of the composite part 100 being formed, thus generally surrounding the resin 110 or other molding compound.

Moreover, it should be appreciated that, for ease of discussion, the laminate sheet supporting frame 134 and components thereof are only shown on one side of the mold 116 (i.e., the right side of the mold 116 in FIG. 5), but in practice the laminate sheet supporting frame 134 is not so limited and may thus include several discrete components on both the right and left side of the mold 116, extending around an entire periphery of the mold 116, or otherwise. For example, in a preferred embodiment, components of the frame 134 would be included on both lateral sides of the mold 116 in line with the contoured features; i.e., the lateral sides of the mold 116 from which laminate sheets 106, 108 will need to be fed in to compensate for the contoured features, which, in the embodiment shown in FIG. 5, would be to the right (shown) and left (not shown) of the mold 116.

At a high level, the laminate sheet supporting frame 134 may include a pair of extension mechanisms 136, 140, each removably coupled to a respective laminate sheet 106, 108 during the forming process. The laminate supporting frame 134 may additionally include a pair of tensioners 138, 142 that are configured to hold the laminate sheets 106, 108 in a tensioned, yet dynamic, state such that the laminate sheets 106, 108 are maintained proximate to the first and second molding surfaces 120, 124, respectively, during the forming process, but are permitted to move into the mold 116 and conform to the cavities therein during the forming process, which will be discussed. The tensioners 138, 142 may be any suitable structure without departing from the scope of the disclosure and, in some embodiments, may include a biasing member or similar. More particularly, in some embodiments, the tensioners 138, 142 may include a linear spring or similar mechanism which permits the laminate sheets 106, 108 to play into the mold 116 during the forming process while keeping the sheets 106, 108 tensioned and adequately suspended within the mold 116. If necessary or desired, the extension mechanisms 136, 140 may be implemented to keep the tensioners 138, 142 sufficiently spaced apart from the mold 116. The tensioners 138, 142 and/or extension mechanisms 136, 140, if equipped, may be coupled to the laminate sheets 106, 108 using any desired means including, by way of example, by clamping, tying, pinning, or similar.

Again, although only one laminate sheet supporting frame 134 is shown in the figures for ease of discussion, in other embodiments the system 114 will include more than one laminate sheet supporting frame 134 and/or the laminate sheet supporting frame 134 will extend beyond the location depicted in FIG. 5. More particularly, in other embodiments there will be at least two frames 134, one proximate to the first laminate sheet opening 126 and a second proximate to the second laminate sheet opening 128, with each frame generally supporting a corresponding edge of the laminate sheets 106, 108. In other embodiments the frame may extend around a majority, or even all, of the periphery of the mold 116, thereby being configured to support the laminate sheets 106, 108 at various locations, depending on the specific application.

The system may also include a spacer 146, which is generally configured to space the laminate sheets 106, 108 apart from one another during the forming process and/or to keep one or both of the laminate sheets 106, 108 in a correct orientation and/or alignment during the forming process. For example, when the mold 116 includes a gate 144 that is proximate one of the laminate sheets 106 as shown in FIG. 5, the corresponding laminate sheet 106 may include a through-hole 148 such that the resin 110 can pass through the laminate sheet 106 and into the internal cavity 130, between the two laminate sheets 106, 108 during the forming process. In such embodiments, the spacer 146 may be used to impart a biasing force on the laminate sheet 106, pressing it against the first mold portion 118 and thus holding the laminate sheet 106 in place during the forming process so that the through-hole 148 remains generally aligned and initially sealed with the gate 144. Additionally or alternatively, the spacer 146 may separate the laminate sheets 106, 108 during the forming process so that the hot laminate sheets 106, 108 do not stick or otherwise meld together. And although only one spacer 146 is shown in the embodiment of the system 114 depicted in FIG. 5, in other embodiments multiple ones of the spacers 146 could be utilized either to accommodate multiple injection sites and/or to provide adequate separation of the two laminate sheets 106, 108 along their length and width during the forming process.

The spacer 146 may be formed from any suitable material and may take any suitable configuration without departing from the scope of this disclosure. For example, in some embodiments the spacer 146 may be formed from a similar or same material as the resin 110 being used during the injection molding process such that the spacer 146 generally melts and melds with the hot resin 110 and seamlessly becomes part of the composite part 100 during the forming process. In such embodiments, by the time the spacer 146 melts and melds with the hot resin 110, the hydrostatic pressure of the resin 110 will keep the laminate sheets 106, 108 in place and thus hold the laminate sheet 106 proximate the gate 144 to thereby ensure a proper seal between the sheet 106 and the mold portion 118 so that no resin 110 escapes between the sheet 106 and the mold portion 118. In other embodiments, the spacer 146 may be formed from a material different from the resin 110 used to form the composite part 100 such as, e.g., any suitable metallic or similar material. In such embodiments, the spacer 146 may not melt and/or meld with the resin 110 during the forming process but nonetheless becomes embedded in the composite part 100 as the resin 110 flows around the spacer 146 and ultimately hardens.

Figure 8:
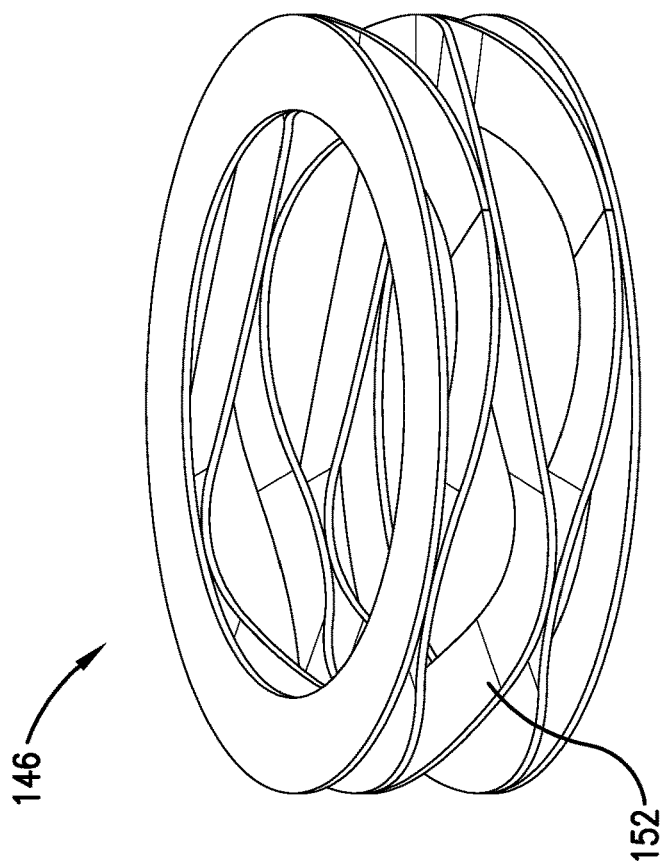
FIG. 8 is a perspective view of a spacer used in systems used to form a composite part, such as the system shown in FIGS. 5-6F, according to some aspects of the disclosure.

In some embodiments the spacer 146 may include a biasing member or itself be formed as a biasing member in order to impart a biasing force on one or both of the laminate sheets 106, 108 during the forming process. For example, as depicted in FIG. 8, in some embodiments the spacer 146 may include a one or more wave springs 152; that is, the spacer 146 may be constructed as a stacked wave spring spacer. Any other desired configuration or material may be employed without departing from the scope of the disclosure.

Although one preferred embodiment of the spacer 146 is shown and described, the spacer 146 is not so limited and in other embodiments the spacer 146 could take other forms without departing from the scope of the disclosure. At a high level, the spacer 146 could be any structure used to separate the laminate sheets 106, 108, properly locate the laminate sheets 106, 108, and/or seal a space between the gate 144 and the sheet 106 next to the gate 144 so that resin does not flow between the sheet 106 and the first mold portion 118 during injection. In this regard, the spacer 146 is any suitable structure that could be used for one or more of spacing the laminate sheets 106, 108 from one another, locating at least one of the laminate sheets 106 in a correct orientation to align with the gate 144, and/or sealing an opening in the laminate sheet 106 at the gate 144.

Figure 6B:
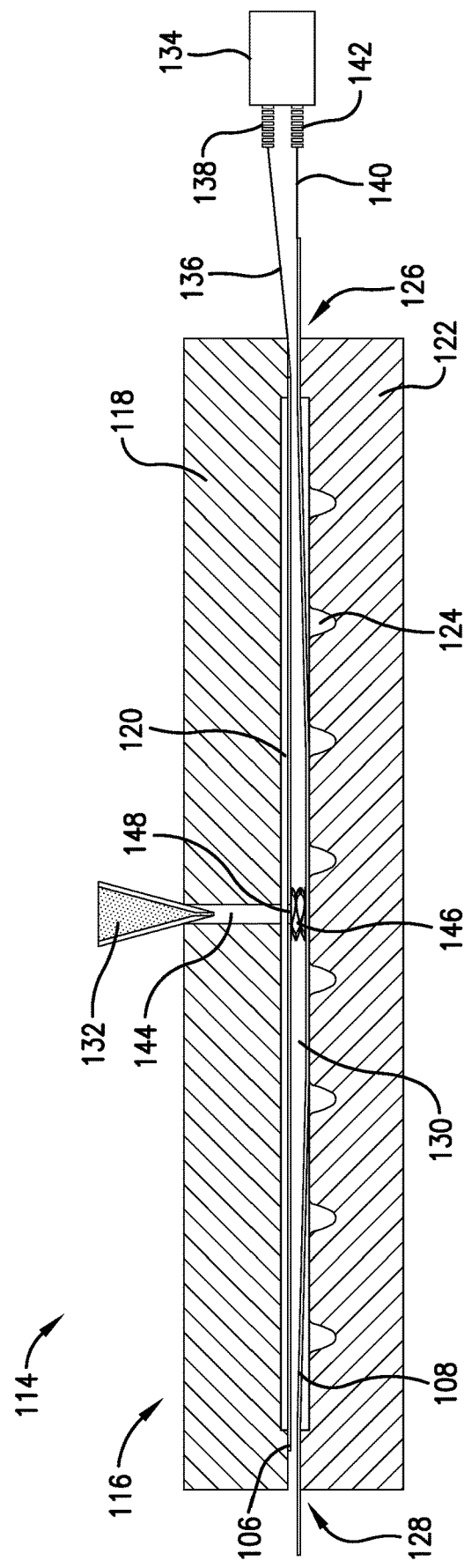

FIGS. 6A-6F schematically illustrate a process for forming a composite part, such as the composite part 100 or similar, using the system 114. First, as seen in FIG. 6A, at least one laminate sheet 106, 108 is suspended in the laminate sheet supporting frame 134. Again, in the depicted and described embodiments, two laminate sheets 106, 108 are utilized but in other embodiments more or less laminate sheets may be employed without departing from the scope of the disclosure. In some embodiments, the laminate sheets 106, 108 are supported in the frame 134 in tensioned state via the extension mechanisms 136, 140 and tensioners 138, 142, or similar components. Moreover, the laminate sheets 106, 108 may be hot at this step; that is, the laminate sheets may be heated to a temperature in which the resin thereof becomes pliable and/or begins to melt such that the sheets 106, 108 will conform and consolidate to the various outer contours of the composite part 100 being formed during the forming process. Again, this may be accomplished via a furnace, oven, induction heater, open flame, infrared element or any other suitable heating means. Moreover, in some embodiments the mold 116 may include heating components and thus be used to heat the laminate sheets 106, 108 once they are suspended in the mold 116, and/or the hot resin 110 may be used, at least partially, to heat the laminate sheets 106, 108. Thus, in some embodiments the laminate sheets 106, 108 may be heated at this step either prior to being suspended in the supporting frame 134 and/or while suspended.

As can be seen in FIG. 6A, when more than one laminate sheet 106, 108 is utilized they may be of unequal length and/or width. This is because each sheet 106, 108 will ultimately conform to a different molding surface 120, 124 and/or portion of the mold 116 and thus varying surface areas will be needed to cover the respective portions. By way of example, in the depicted embodiment the first molding surface 120 has a much simpler configuration than the second molding surface 124, because the first molding surface 120 is merely used to form the back of the planar, main body 102 of the composite part 100 while the second molding surface 124 is used to form the top of the planar, main body 102 in addition to the multiple contoured features 104 extending therefrom. Thus, in this embodiment laminate sheet 108 is wider than laminate sheet 106 because more surface area is necessary to blanket the second molding surface 124 and thus a greater portion of the second laminate sheet 108 will be pulled into the mold 116 during the forming process than the portion of the first laminate sheet 106 that is pulled into the mold 116.

Optionally, at the step depicted in FIG. 6A one or more spacers 146 can be placed in the mold 116 at desired locations in order to, e.g., maintain the laminate sheets 106, 108 apart from one another and/or at a desired location and in a desired configuration. For example, in the depicted embodiment the first mold portion 118 includes a gate 144 at approximately a central portion thereof. Thus, the first laminate sheet 106 may include a through-hole 148 at approximately a central portion thereof that is generally aligned with the gate 144 at this step. The spacer 146, in turn, may be placed in such a way to maintain the through-hole 148 with the gate 144 and in some embodiments may include a biasing member 152 to impart a biasing force against the laminate sheet 106, holding it sealed until the hydrostatic pressure from the resin acts on the area of the first laminate surrounding the through-hole 148, making the biasing member no longer needed. The spacer 146 may further be used to separate the first laminate sheet 106 from the second laminate sheet 108, which otherwise may stick and meld together because they are heated to the workability temperature, as discussed. Again, the spacer 146 may be omitted, or more than one spacer 146 or differently configured spacer 146 may be employed, without departing from the scope of the disclosure.

At the step shown in FIG. 6B, the mold portions 118, 122 are closed around the laminate sheets 106, 108 such that portions of the laminate sheets 106, 108 extend outside of the closed mold 116. In the depicted embodiment, portions of both laminate sheets 106, 108 extend outside of the internal cavity 130, and portions of laminate sheet 108 extend even further outside of the mold 116 altogether, via the mold openings 126, 128. In other embodiments, depending on the specific features being molded and the configuration of the mold 116, both laminate sheets 106, 108 may extend outside the internal cavity 130 but not outside of the mold 116 body itself and/or both laminate sheets 106, 108 may extend completely outside of the mold 116 body. At this step, if necessary, the injection nozzle 132 may be moved into place. Again, in the depicted embodiment this includes moving the injection nozzle 132 into a position where it aligns with the gate 144 and the through-hole 148 provided in the first laminate sheet 106.

Figure 6C:
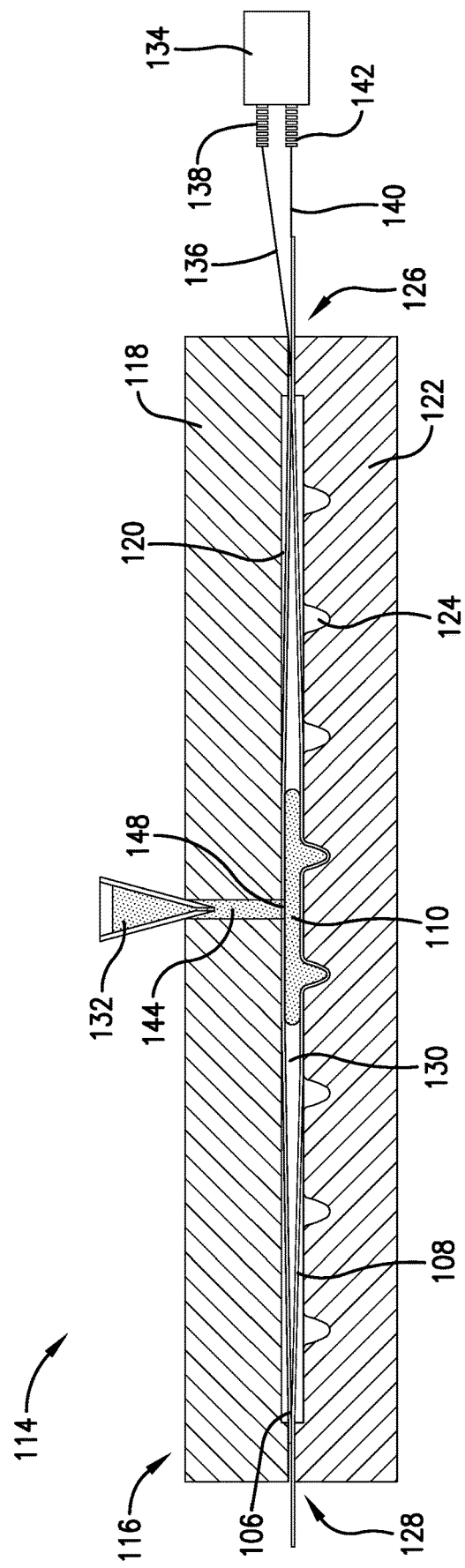
Figure 6D:
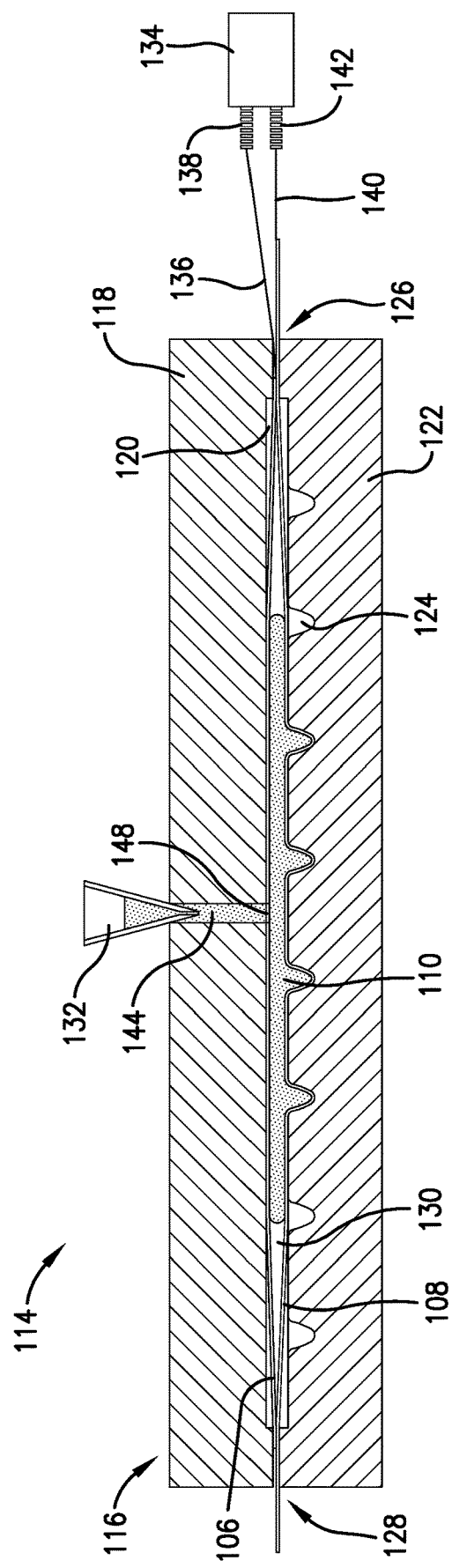
Figure 6E:
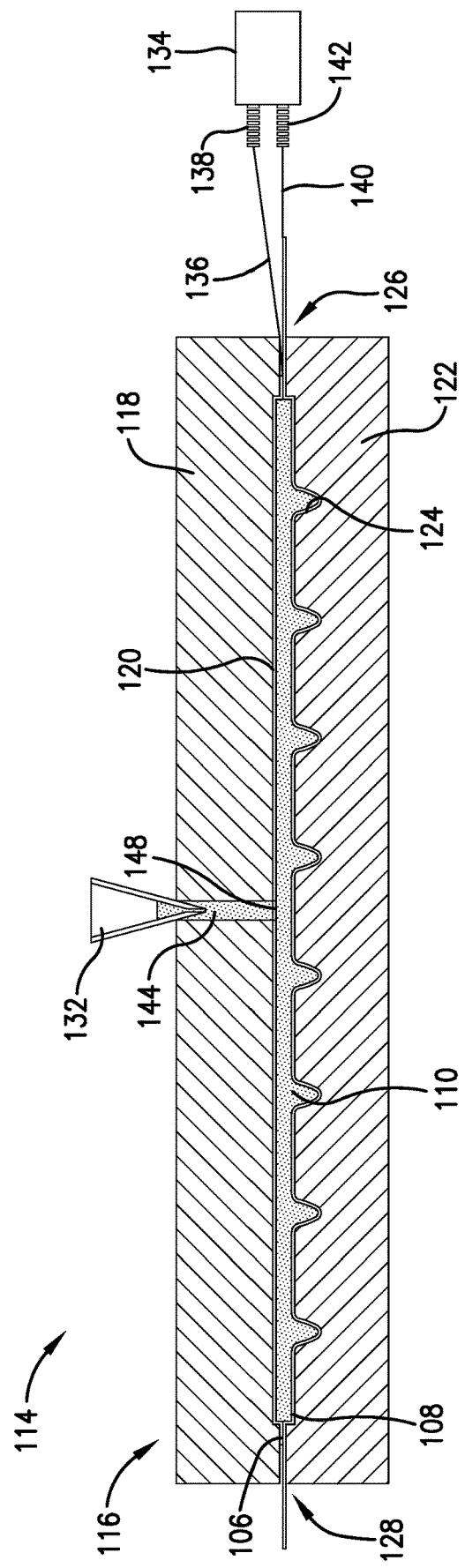

At the steps depicted in FIGS. 6C-6E, the composite part is molded by injecting the resin 110 into the internal cavity 130 while simultaneously permitting the portion of at least one laminate sheet 106, 108 extending outside of the closed mold 116 to enter the closed mold 116 through at least one opening 126, 128 and conform to at least a portion of the internal cavity 130 as it is being subjected to the hydrostatic pressure of the resin 110. More particularly, as the resin 110 is injected between the laminate sheets 106, 108, the hydrostatic pressure of the flowing resin 110 begins to displace the hot laminate sheets 106, 108, pressing them into the outer contours of the mold 116 and, more particularly, into the molding surfaces 120, 124 of the mold portions 118, 122. As the sheets 106, 108 are pressed into the molding surfaces 120, 124 and generally conform to the outer contours of the composite part 100 being formed, the laminate sheet supporting frame 134—and, more particularly, the extension mechanisms 136, 140 and/or tensioners 138, 142 thereof—permit the sheets 106, 108 to play into the mold 116 via the openings 126, 128. This may be best understood by comparing FIG. 6C to FIG. 6D, wherein, due to the more resin 110 that has been injected into the mold 116 by the step depicted in FIG. 6D, more of the laminate sheet 108 has been pulled into the mold 116 in FIG. 6D than in 6C. The second extension mechanism 140 and/or the second tensioner 142 compensate for such movement by, e.g., elongating a tension spring or similar such that laminate sheet 108 remains tensioned and suspended as it is fed into the mold 116.

At the step depicted in FIG. 6E, the composite part 100 has been fully formed; that is, the resin 110 has been fully injected such that the internal cavity 130 is filled with resin 110 sandwiched by the two laminate sheets 106, 108, which in turn conform to the first and second molding surfaces 120, 124, respectively. At this point, the laminate sheets 106, 108 have been played into the mold 116 a maximum amount, which is schematically illustrated by the elongation of the second tensioner 142 and, to some extent, the first tensioner 138. In this step, the hydrostatic pressure of the resin 110 serves to press the hot laminate sheets 106, 108 into the molding surfaces 120, 124 while they consolidate, cool, and set in place.

Figure 6F:
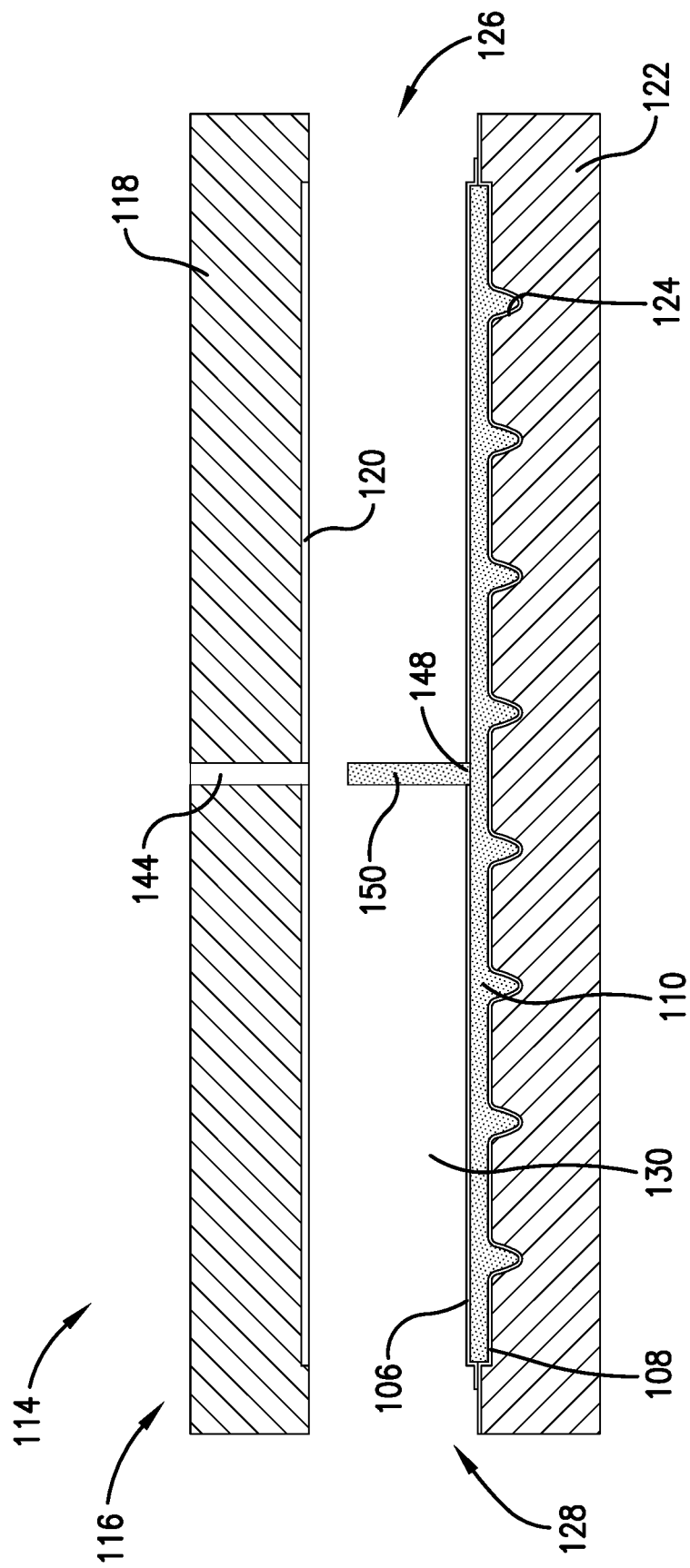
Figure 7:
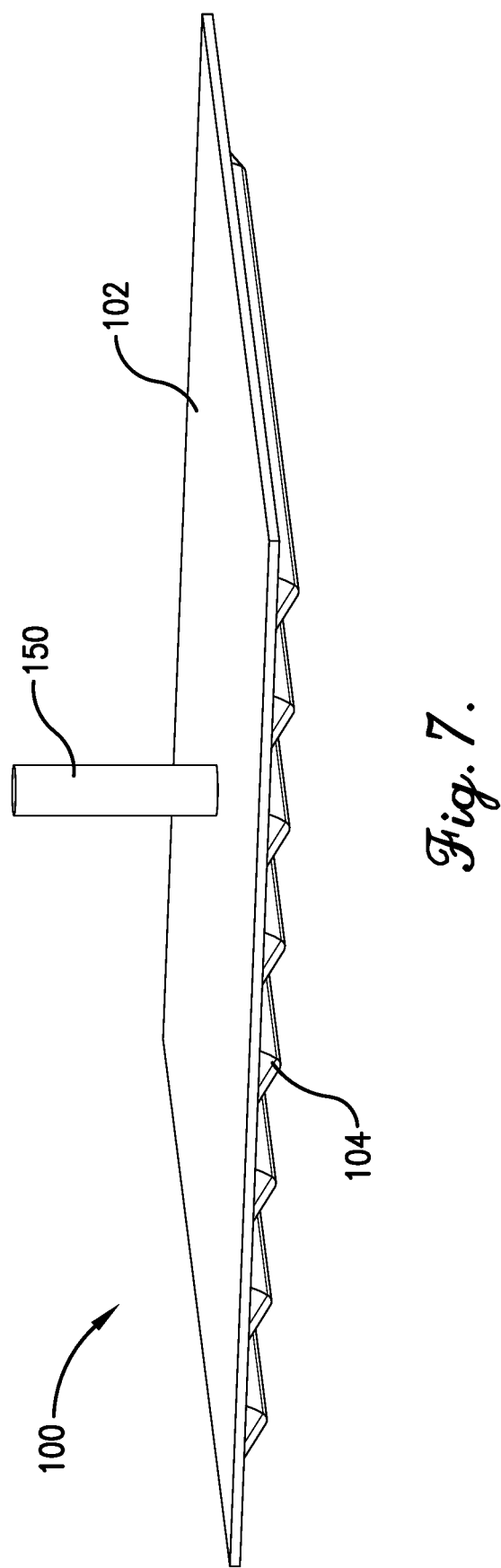
FIG. 7 is a perspective view of the composite part shown in FIGS. 1-4 and including a resin remnant from the forming process shown in FIGS. 6A-6F.

Finally, after the composite part 100 is allowed to cool and harden, as shown in FIG. 6F the laminate sheet supporting frame 134 is removed from the laminate sheets 106, 108, and the mold 116 is opened to remove the composite part therefrom. Optionally, the composite part can be trimmed to remove any unwanted resin 110 and/or laminate sheet 106, 108 residue therefrom. For example, as best seen in FIG. 6F, the laminate sheets 106, 108 may generally form a flange around the periphery of the composite part 100 where the sheets 106, 108 came together and melded during the forming process. This residual flange can be trimmed to result in the composite part 100 shown in FIG. 7. Moreover, the composite part 100 may include a resin remnant or sprue 150 where resin collected in the gate 144 and hardened during the cooling process. As shown in FIGS. 6F and 7, the resin remnant 150 remains attached, and could be used for handling or moving the composite part 100. Optionally, at this step the resin remnant 150 could be trimmed from the composite part 100 to result in a substantially planar back side of the main body 102 of the composite part 100, as shown in FIGS. 1-4.

In some embodiments, the molds, systems, and methods described herein may include one or more seals provided at the periphery of the mold 116, in the laminate sheet openings 126, 128 or otherwise in order to prevent resin 110 from escaping from the mold 116 during the forming process. That is, because the mold 116 described herein includes openings 126, 128 to permit portions of the laminate sheets 106, 108 to be pulled into the mold 116 during the forming process as discussed, there is some risk that the hot resin 110 could escape through such openings 126, 128 during the formation process. Embodiments thus incorporate one or more seals that beneficially allow the laminate sheets 106, 108 to slide into the mold 116 during the forming process but which prevent the hot resin 110 inside the internal cavity 130 from escaping.

Figure 9A:
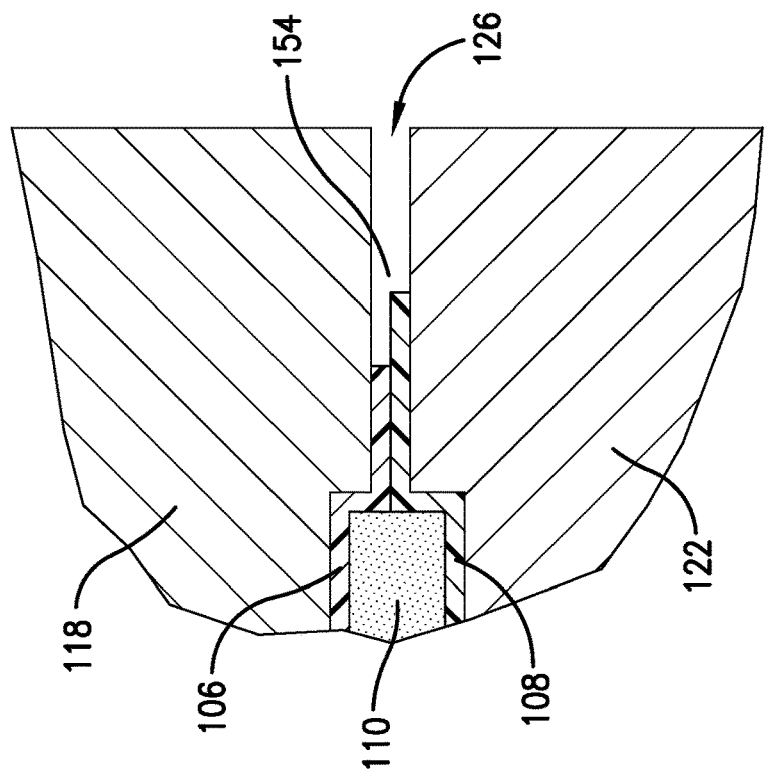
FIGS. 9A-9C are partial, close-up views of the system shown in FIGS. 5-6F and illustrating various embodiments of a seal according to some aspects of the disclosure.
Figure 9C:
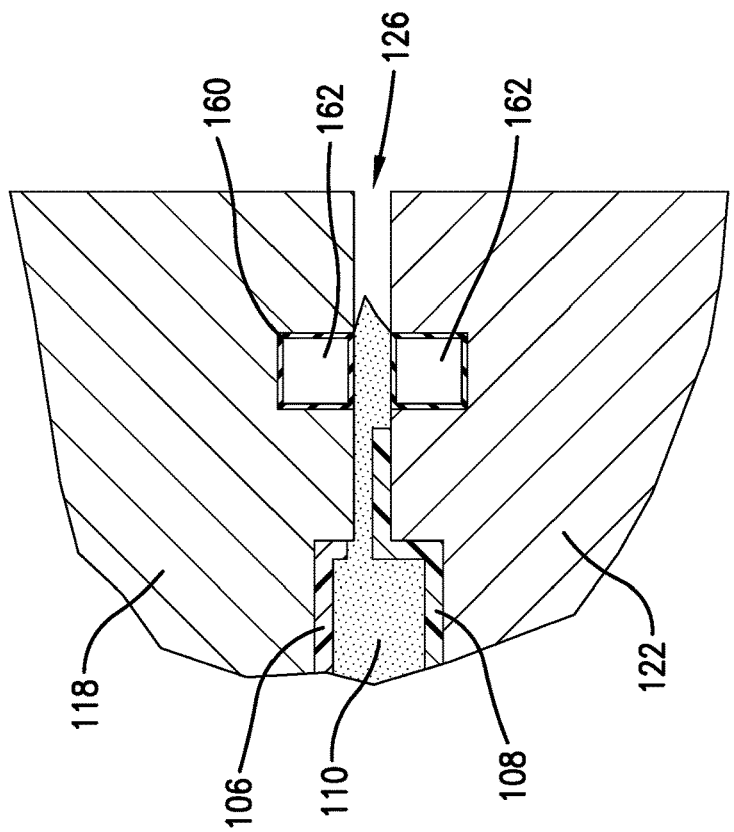
Figure 9B:
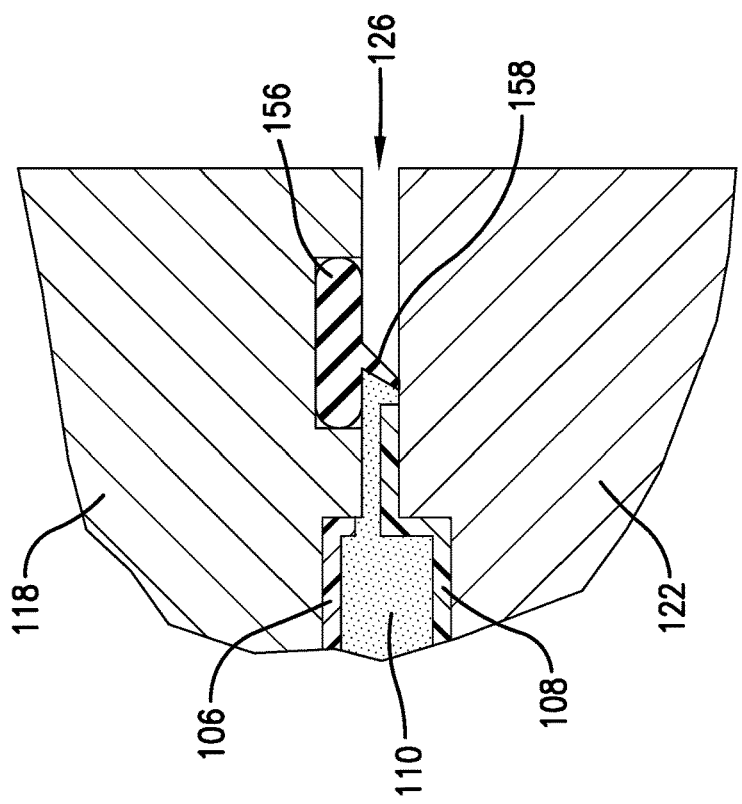

This will be better understood with reference to FIGS. 9A-9C, which show three example embodiments of edge seals that could be implemented in the mold 116 and system 114 discussed above according to aspects of the disclosure. Although each embodiment is shown and described in connection with the first laminate sheet opening 126, the seals could be implemented on any other opening provided in the mold 116, including the second laminate sheet opening 128 or other openings, without departing from the scope of the disclosure.

First, FIG. 9A shows a gap-clearance seal 154 as one example seal that could implemented. In this embodiment, the first laminate sheet opening 126 is sized and configured to receive the two laminate sheets 106, 108 in a clearance fit. More particularly, a height of the first laminate sheet opening 126 is equal to the combined thickness of the first laminate sheet 106 and second laminate sheet 108 together with any applicable tolerance. This permits the laminate sheets 106, 108 to slide through the opening 126 as discussed, while preventing the resin 110 from flowing outwardly therefrom due to the presence of the sheets in the 106, 108 in the opening 126. Put another way, the laminate sheets 106, 108 themselves serve to bridge the gap of the opening 126 and thus prevent any resin 110 from flowing out of the internal cavity 130 of the mold. In such embodiments it may be beneficial to configure the laminate sheets 106, 108 such that at least a portion of each sheet 106, 108 remains in the opening 126 even after all resin 110 has been injected into the mold 116, thereby maintaining the seal. Accordingly, once the composite part 100 cools and solidifies, it may be desirable to trim these excess portions of the laminate sheets 106, 108 from the periphery of the composite part 100.

FIG. 9B shows a hinged-lip seal 156 as another embodiment of a seal that could be implemented according to aspects of the disclosure. In this embodiment, the seal 156 includes a hinged or flexible portion 158 blocking the gap formed by the first laminate sheet opening 126 and biased towards the internal cavity 130 of the mold 116. The hinged-lip seal 156 may be formed from any suitable material such as, e.g., rubber or similar material. Because the hinged portion 158 is slanted and biased towards the internal cavity 130 of the mold 116, the hinged portion 158 permits the laminate sheets 106, 108 to seamlessly slide inwardly, under the hinged portion 158 but prevents any resin 110 from flowing outwardly from the mold 116. More particularly, the hydrostatic pressure from any resin 110 flowing outwardly would press the hinged portion 158 firmly against either a portion of the mold 116 (in this case, the second mold portion 122) and/or one of the laminate sheets 106, 108, firmly sealing the gap created by the first laminate sheet opening 126. Accordingly, in this embodiment once the composite part 100 solidifies there may be remnants of one or more of the laminate sheets 106, 108 and/or remnants of the resin 110 extending from the periphery of the composite part that optionally may be trimmed.

FIG. 9C shows a heat-exchanger seal 160 as another embodiment of a seal that could be implemented according to aspects of the disclosure. In this embodiment, a pair of cooling tubes 162 including a cooling fluid circulating therein are placed proximate the laminate sheet opening 126 to locally cool the mold 116, and thus the material proximate thereto, during the forming process. Any suitable cooling fluid or refrigerant can be utilized without departing from the scope of the disclosure. In this embodiment, by locally cooling the mold 116 within the first laminate sheet opening 126, the resin 110 will cool and harden before escaping from the mold 116. Again, in this embodiment once the composite part 100 solidifies there may be remnants of one or more of the laminate sheets 106, 108 and/or remnants of the resin 110 extending from the periphery of the composite part that optionally may be trimmed.

Although various aspects of the disclosure have been described with reference to the embodiments illustrated in the attached drawings, it is noted that equivalents may be employed without departing from the scope of the invention as recited in the claims.

The invention claimed is:

1. A system for forming a composite part comprising:
a mold including:
  a first mold portion including a first molding surface;
  a second mold portion including a second molding surface; and
  at least one laminate sheet opening between the first mold portion and the second mold portion when the mold is in a closed, molding configuration,
  wherein, when the mold is in the closed, molding configuration, the first molding surface and the second molding surface collectively at least partially form an internal cavity inward of the at least one laminate sheet opening and defining an outer contour of the composite part being formed;
an injection molding nozzle positioned to inject resin into the internal cavity during the forming of the composite part; and
a laminate sheet supporting frame located outside of the mold and proximate to the at least one laminate sheet opening, wherein the laminate sheet supporting frame is attachable to at least one laminate sheet such that a portion of the at least one laminate sheet is passable through the at least one laminate sheet opening from the outside of the mold to the internal cavity when the mold is in the closed, molding configuration, wherein the laminate sheet supporting frame includes at least one tensioner attachable to the at least one laminate sheet and elongatable when the at least one laminate sheet is fed into the mold.

2. The system of claim 1, wherein one of the first mold portion and the second mold portion includes an injection opening in communication with the internal cavity of the mold, and wherein the injection molding nozzle is configured to inject the resin into the internal cavity of the mold via the injection opening.

3. The system of claim 2 further comprising a spacer configured to maintain the at least one laminate sheet proximate the injection opening during the forming of the composite part.

4. The system of claim 1, further comprising at least two laminate sheets including a first laminate sheet and a second laminate sheet, wherein the laminate sheet supporting frame supports the at least two laminate sheets such that a portion of the first laminate sheet extends through the at least one laminate sheet opening and conforms to a portion of the first molding surface, and such that a portion of the second laminate sheet extends through the at least one laminate sheet opening and conforms to a portion of the second molding surface.

5. The system of claim 1 further comprising a seal provided in the at least one laminate sheet opening, wherein the seal restrict the resin from flowing outside of the mold through the at least one laminate sheet opening during the forming of the composite part while permitting the portion of the at least one laminate sheet to extend through the at least one laminate sheet opening from the outside of the mold to the internal cavity.

6. The system of claim 5, wherein the seal comprises at least one of a gap-clearance seal, a hinged-lip seal, and a heat-exchanger seal.

7. A mold for forming a composite part comprising:
a first mold portion including a first molding surface;
a second mold portion including a second molding surface;
at least one laminate sheet opening formed between the first mold portion and the second mold portion when the mold portions are in a closed, molding configuration;
a tension spring positioned outward of and proximate to the at least one laminate sheet opening, wherein the tension spring is attachable to at least one laminate sheet,
wherein, when the mold is in the closed, molding configuration, the first molding surface and the second molding surface collectively at least partially form an internal cavity defining an outer contour of the composite part being formed, and
wherein, when the mold is in the closed, molding configuration, the at least one laminate sheet opening is of a height such that a portion of the at least one laminate sheet is slidable through the at least one laminate sheet opening into the internal cavity from an outside of the internal cavity by elongation of the tension spring.

8. The mold of claim 7, further comprising an injection opening provided in one of the first mold portion and the second mold portion, wherein the injection opening is in communication with the internal cavity of the mold and permits resin to flow into the internal cavity of the mold during the forming of the composite part.

9. The mold of claim 8 further comprising a spacer configured to maintain the at least one laminate sheet proximate the injection opening during the forming of the composite part.

10. The mold of claim 9, wherein the spacer is further configured maintain a through-hole provided in the at least one laminate sheet proximate the injection opening during the forming of the composite part such that during the forming of the composite part resin flows into the internal cavity of the mold via the injection opening and the through-hole.

11. The mold of claim 7, wherein the height of the at least one laminate sheet opening is such that portions of at least two laminate sheets fit simultaneously into the at least one laminate sheet opening and into the internal cavity from the outside of the internal cavity when the mold is in the closed, molding configuration.

12. The mold of claim 7 further comprising a seal provided in the at least one laminate sheet opening, wherein the seal is operable to restrict resin from flowing outside of the mold through the at least one laminate sheet opening during the forming of the composite part and to permit the portion of the at least one laminate sheet to extend through the at least one laminate sheet opening from the outside of the internal cavity to within the internal cavity.

13. The mold of claim 12, wherein the seal comprises at least one of a gap-clearance seal, a hinged-lip seal, and a heat-exchanger seal.

* * * * *